Feb. 16, 1965  R. H. ROMNEY  3,169,607
ROTARY LATCH
Filed Feb. 7, 1962  2 Sheets-Sheet 1

INVENTOR.
RUSSELL H. ROMNEY
BY
ATTORNEY

INVENTOR.
RUSSELL H. ROMNEY
BY
ATTORNEY

3,169,607
ROTARY LATCH

Russell H. Romney, Salt Lake City, Utah, assignor to Sperry Rand Corporation, Great Neck, N.Y., a corporation of Delaware
Filed Feb. 7, 1962, Ser. No. 171,648
2 Claims. (Cl. 188—69)

This invention relates to a device for accomplishing the repeated latching and unlatching of a pair of cooperative coaxial machine elements, one or both of which are rotatable about their common axis.

The invention may be used in a mechanical linkage between a trunnion mounted gun and its sight, for example. It is a requirement of some weapon systems that the gun be elevated to a fixed position for loading. In systems of this type, it is usually required that some means exist whereby the sight is able to continually track the target, even during the reload cycle. Upon completion of the reload cycle, the gun must, of course, be accurately realigned with the sight. Previously this has been accomplished by one or more of a wide variety of servo systems. However, said servo systems are often complicated, usually resulting in a corresponding amount of unreliability and inaccuracy.

It is a primary object of the present invention to provide a rotary latch that permits precise repeated latching and unlatching which is positive in operation and structurally simple.

Another object of the present invention is a fail-safe rotary latch that is normally automatically operated but may be manually operated in cases of emergency loss of power.

The above objects are achieved by the rotary latch of the present invention which has spherical latching members that are positionable within respective frusto-conical holes. The holes are defined by cooperative apertures in the peripheries of first and second cooperative discs which form the elements to be latched. The spheres when disposed within the respective holes tend to be sheared by the sides thereof thereby securing one element to the other. With the spheres positioned externally of the holes, one element is free to rotate with respect to the other.

Referring to the drawings.

Figure 1:
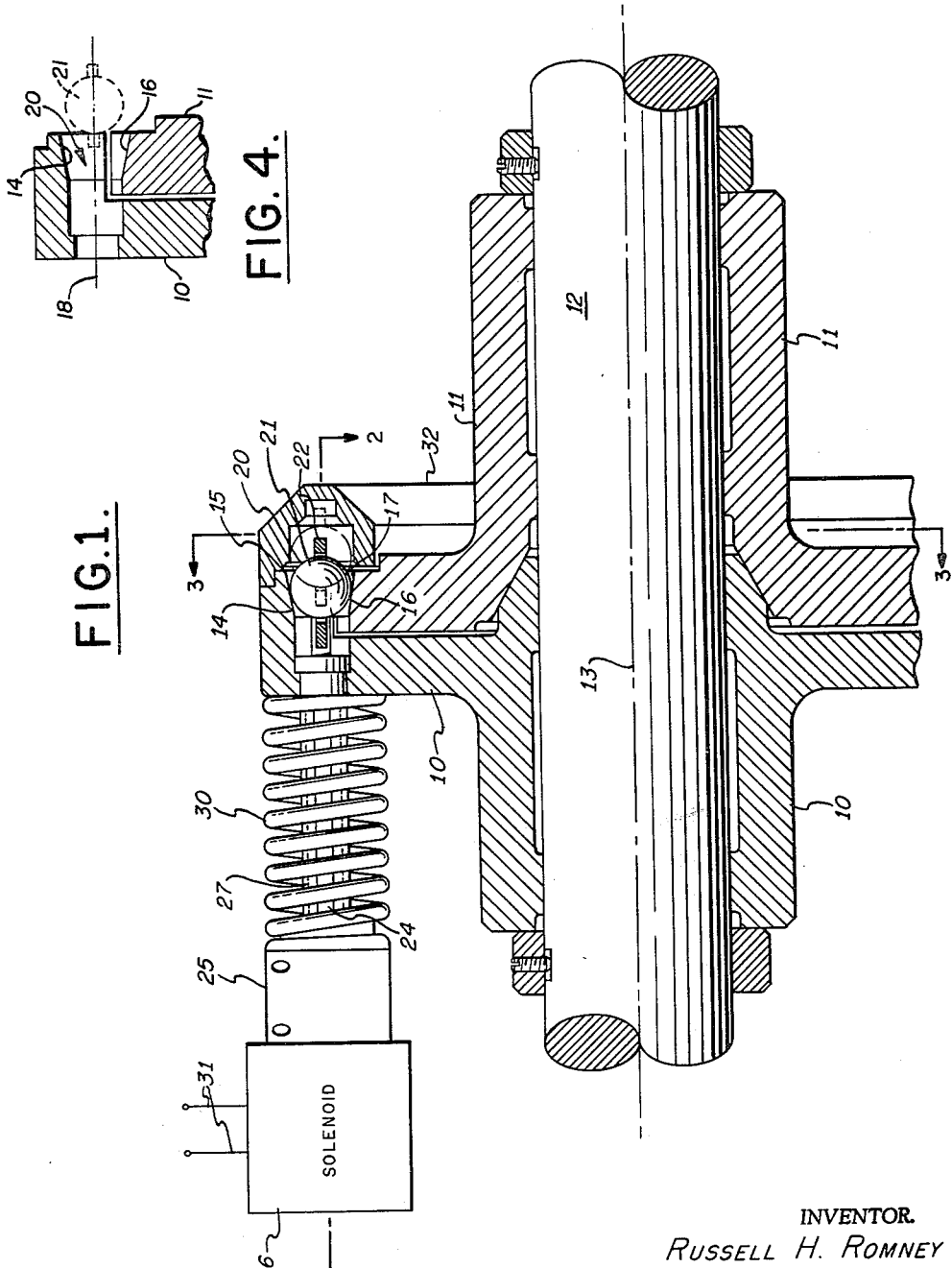
FIG. 1 is an elevational view partly in section showing the rotary latch of the present invention.
Figure 2:
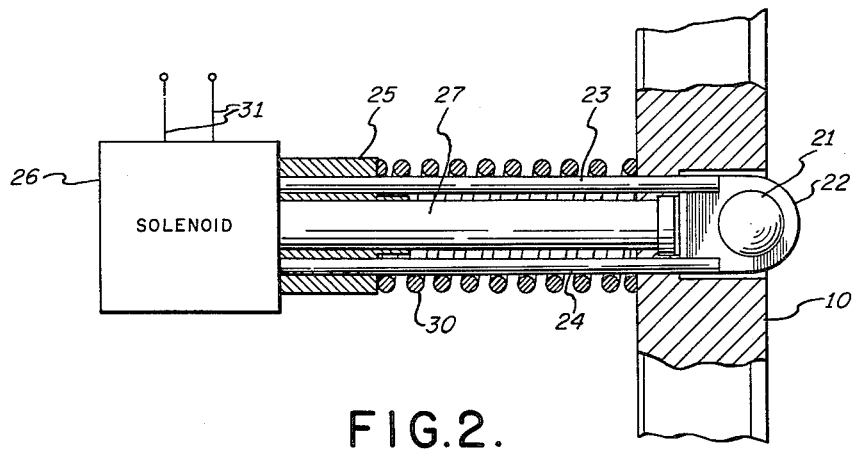
FIG. 2 is a sectional view taken along lines 2—2 of FIG. 1.

FIG. 4 is a partial elevational view of FIG. 1 showing the relative locations of the discs 10 and 11 with the sphere 21 shown in dotted lines in the disengage position.

Referring now to FIG. 1, for purposes of explanation the invention will be applied as a mechanical linkage between a trunnion mounted gun and its sight. It will be appreciated, however, that the invention is equally applicable to other military and industrial applications such as for accomplishing the precision rotary indexing required by various types of metal working machines.

For simplicity the invention will be described with both discs 10 and 11 rotatably mounted on a fixed shaft 12. Although not shown, it will be understood that the outer disc 10 and the inner disc 11 are connected respectively to suitable mechanical linkages which in turn are connected to the gun and to the sight in order that with both discs 10 and 11 locked together in a particular rotary position relative to each other, the gun and the sight elevate in proper aimed alignment with each other.

Figure 3:
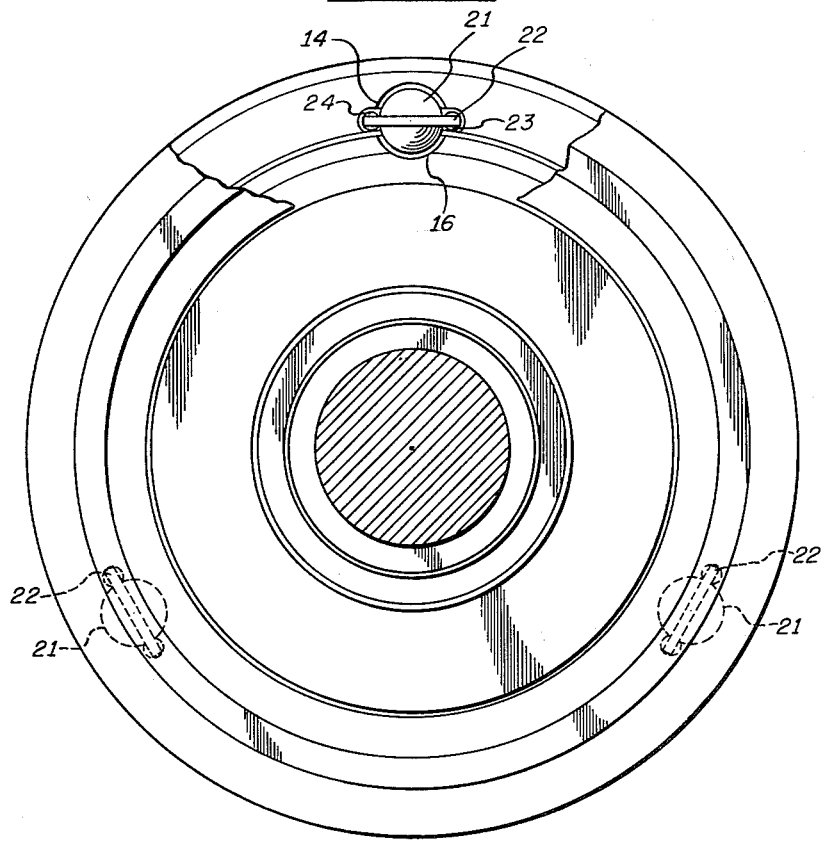
FIG. 3 is a sectional view taken along lines 3—3 of FIG. 1.

The discs 10 and 11 are disposed adjacent to each other with the inner disc 11 nested within the outer disc 10. The axes of symmetry of each of the discs 10 and 11 are coincident with a common axis 13 about which they rotate. The outer disc 10 has a plurality of circumferentially spaced tapered recesses 14 around the inner periphery 15 thereof. In the embodiment shown in FIG. 3, there are three equally spaced apertures 14 120° apart. The inner disc 11 has a corresponding number of circumferentially spaced tapered recesses 16 around its outer periphery 17. The apertures 14 and 16 are cooperatively disposed to define in combination frusto-conical holes 20, each of which is adapted to receive a sphere 21. In the embodiment shown in FIG. 3, three holes 20 are provided. The relative size of each of the holes 20 with respect to the size of its associated sphere 21 is such that with the sphere 21 disposed within the hole 20 as shown in FIG. 1, the sphere 21 contacts the outer and inner discs 10 and 11 to lock the discs 10 and 11 to each other in order that they rotate as a unit. With the spheres 21 translated to the right in a direction parallel to the axis 13 as shown in dotted lines in FIG. 1, the spheres 21 are external to the holes 20. In this position of the spheres 21 as shown more clearly in FIG. 4, they are out of contact with the discs 10 and 11 thereby permitting the discs 10 and 11 to rotate relative to each other. In order to achieve the above, the frusto-conical hole 20 as shown more clearly in FIG. 4 has its larger or right hand diameter as viewed in FIG. 4 larger than the diameter of the sphere 21 and the hole 20 tapers to a smaller or left hand diameter that is smaller than the diameter of the sphere 21. The surface of each of the recesses 14 and 16 is conical and taper towards each other with the axis of symmetry 18 of the frustro-conical hole 20 parallel to the common axis 13.

For simplicity of explanation, only the structure for securing and positioning one of the spheres 21 will be described since the others are identical. In order to position a sphere 21, it is rotatably mounted in a cage 22. The cage 22 in turn is connected to two guide rods 23 and 24 which project through openings in the outer disc 10 in a direction parallel to the axis 13. The rods 23 and 124 are connected to a plunger 25 of a solenoid 26 from which a pedestal 27 extends. The plunger 25 is slidably mounted on the pedestal 27 which in turn is suitably secured to the disc 10 in order that the sphere positioning assembly rotates with the disc 10. The sphere 21 is spring loaded by a helical spring 30 in a direction to maintain contact with the discs 10 and 11. The spring 30 encircles the rods 23 and 24 and is disposed under compression between the disc 10 and the plunger 25. The guide rods 23 and 24 are secured to the plunger 25 by means of set screws or other suitable means.

The solenoid 26 is energized by a signal through its flexible leads 31. In its energized position the solenoid plunger 25 is urged to the right as viewed in the drawing thereby positioning the sphere 21 from its solid line position to its dotted line position, i.e., from within the hole 20 to a position external thereof.

In the embodiment shown in the drawings, three solenoids 26 position respective spheres 21 preferably simultaneously, for example, by being simultaneously energized through a common switch not shown. An enclosure 32 may extend circumferentially around the holes 20 and spheres 21 to prevent foreign matter from interfering with the operation of the spheres 21.

In operation with the solenoids 26 unenergized, the spheres 21 are resiliently urged in their leftward position by the springs 30 and contact the discs 10 and 11 thereby locking the discs 10 and 11 to each other causing the gun and the sight not shown to elevate in proper aimed alignment with each other. After the gun is fired and it is necessary to reload the gun at a particular elevation, the solenoids 26 are simultaneously energized by a signal through their respective leads 31. The solenoid plungers 25 are urged to the right thereby positioning the spheres 21 to their dotted line positions out of contact with the discs 10 and 11. The gun is thus permitted to elevate to the proper position for loading while the sight continuously tracks the target. Upon reloading, the gun is again aligned with the sight and the solenoids 26 are then deenergized causing the springs 30 to resiliently hold the spheres 21 in contact with the discs 10 and 11 in order that the gun and sight elevate in proper aimed synchronism.

In the embodiment shown, the elevation of the gun and its sight is limited to less than the 120° angular separation of the holes 20; therefore, no possibility exists of engaging the discs 10 and 11 in an incorrect rotary position relative to each other. Certain other embodiments of the invention may require that the discs 10 and 11 rotate beyond the 120° angular separation of the holes 20, thereby creating the possibility of engaging the discs in an incorrect rotary position relative to each other. This possibility is readily eliminated, however, by any one of a variety of auxiliary interlock mechanisms.

It will be noted that the latching operation of the present invention is positive and simple since each sphere 21 tends to be sheared by the sides of its associated tapered hole 20 which is split on its conical axis between the two rotary discs 10 and 11 being latched. Further, the forces holding the spheres 21 in their respective holes 20 have no tendency to separate the discs 10 and 11 either radially or axially. It will be further noted that the tapered lock design in conjunction with the use of spheres 21 provides self compensation for wear, eliminates all backlash and features line contact of the spheres 21 with their cooperating tapered sides 14 and 16 of the discs 10 and 11 thus avoiding the brinneling problem of point contact and the alignment problem of area contact.

Other advantages of the present invention include (a) normally engaged when deenergized, permitting manual operation under emergency loss of power, (b) ease of delatching—little tendency for self locking action, (c) no alignment problem for the spherical locking element, (d) precision spherical locking elements are readily obtainable at nominal cost, (e) free sphere which tends to randomize wear, (f) the forces holding the spheres in their tapered holes tend to engage rather than disengage the discs, (g) the spheres are symmetrically positioned with respect to the discs thereby tending to avoid cocking or unbalance, and (h) minimum travel for actuation permits easy solenoid operation.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A rotary latch comprising first and second adjacent discs having coincident axes of symmetry which form a common axis, said first disc being nested within said second disc, at least one of said discs being rotatable about said common axis, said first disc having a plurality of circumferentially spaced tapered recesses in the external periphery thereof, said second disc having a corresponding number of circumferentially spaced tapered recesses in the internal periphery thereof, said recesses being cooperatively disposed and adapted to define in combination a plurality of frustro-conical holes by means of the surfaces of said recesses, each of said surfaces being conical and tapering towards each other, each of said holes being adapted to receive a sphere, a corresponding number of spheres adapted to be retained individually in said holes, said tapered holes and said spheres being so constructed and arranged that with said spheres disposed within said holes said spheres contact said first and second discs to lock said first and second discs to each other in a precise predetermined relation upon positioning said tapered spheres within said holes and with said spheres disposed external to said holes said spheres are out of contact with said discs and said discs are rotatable relative to each other, and common activating means for simultaneously selectively positioning said spheres either within or external to said holes including resilient positionable sphere caging means for securely holding said spheres in a desired position.

2. A rotary latching and indexing device comprising first and second adjacent discs having coincident axes of symmetry which form a common axis of rotation, said discs being rotatable relative to each other about said common axis of rotation, said first disc having a plurality of circumferentially spaced tapered apertures around the external periphery thereof, said second disc having a corresponding number of circumferentially spaced tapered recesses around the internal periphery thereof, said recesses being cooperatively disposed and adapted to define in combination a plurality of frustro-conical holes by means of the surfaces of said recesses each of which is conical and taper towards each other, each of said holes being adapted to receive a sphere, a corresponding number of spheres adapted to be retained individually in said holes for rotation about said common axis, the relative sizes of said tapered holes with respect to said spheres being such that with said spheres disposed within said holes said spheres contact said first and second discs to lock said first and second discs to each other in a precise predetermined relation upon positioning said tapered spheres within said holes and with said spheres disposed external to said holes said spheres are out of contact with said discs and said discs are rotatable relative to each other, and common positioning means including positionable sphere caging means for simultaneously positioning said spheres in a direction parallel to said common axis for positioning said spheres within or external to said holes, said positioning means including resilient means for continuously resiliently urging said spheres in an axial direction towards said holes, said positioning means including means for overcoming said resilient means when positioning said spheres external to said holes.

References Cited in the file of this patent

UNITED STATES PATENTS

| 1,646,646 | Gaylord | Oct. 25, 1927 |
| 2,201,118 | Beede | May 14, 1940 |
| 2,291,151 | Dunn | July 28, 1942 |
| 2,359,267 | Horowitz | Sept. 26, 1944 |
| 2,493,232 | Dodge | Jan. 3, 1950 |
| 2,874,814 | Beck | Feb. 24, 1959 |
| 3,050,321 | Howe et al. | Aug. 21, 1962 |

FOREIGN PATENTS

| 3,773 | Great Britain | of 1898 |
| 437,343 | Great Britain | July 16, 1934 |
| 696,035 | Great Britain | Aug. 19, 1953 |